United States Patent

[11] 3,591,741

| [72] | Inventor | Fred E. Tutthill<br>Grafton, Ohio |
|------|----------|-----------------------------------|
| [21] | Appl. No. | 806,842 |
| [22] | Filed | Mar. 13, 1969 |
| [45] | Patented | July 6, 1971 |
| [73] | Assignee | American Crucible Products Co.<br>Lorain, Ohio |

[54] PRESSURE RESPONSIVE LIQUID LEVEL PUMP CONTROL
8 Claims, 2 Drawing Figs.

| [52] | U.S. Cl. | 200/83 |
|------|----------|--------|
| [51] | Int. Cl. | H01h 35/34 |
| [50] | Field of Search | 200/81, 83, 83.1, 83.91 |

[56] References Cited
UNITED STATES PATENTS

| 2,131,264 | 9/1938 | Benjamin | 200/83 |
| 2,635,546 | 4/1953 | Enyeart et al. | 103/12 |
| 2,804,516 | 8/1957 | Staak | 200/83.91 |
| 3,366,759 | 1/1968 | Tutthill | 200/83 |

*Primary Examiner*—Robert K. Schaefer
*Assistant Examiner*—M. Ginsburg
*Attorney*—Bosworth, Sessions, Herrstrom and Cain

ABSTRACT: A pressure responsive control for pumps. The pump is controlled by a switch operated by a pressure sensitive diaphragm whose effective diameter may be changed to vary the pressure at which the pump is started and whose point of response is adjustably predetermined by a preloading spring means.

INVENTOR.
FRED E. TUTTHILL

INVENTOR.
FRED E. TUTTHILL

3,591,741

PRESSURE RESPONSIVE LIQUID LEVEL PUMP CONTROL

BACKGROUND OF THE INVENTION

This invention relates to pump controls and more particularly, to pressure responsive, liquid level pump controls.

DESCRIPTION OF THE PRIOR ART

Pump controls, which are responsive to the static pressure of a first predetermined liquid level to actuate the pump motor and to a change in conditions resulting from operation of the pump such as a reduction of the static pressure to that of a second, lower predetermined liquid level to deactuate the pump motor, are well known in the art.

Certain of the early pressure responsive pump controls have a plurality of pressure sensitive diaphragms and switches adapted to respond, in a predetermined sequence, to changes in pressure conditions, as liquid collected to a predetermined level and then was reduced, by the operation of the pump, to a lower predetermined level to actuate, maintain the operation of and deactuate the pump motor. Such controls are shown, for example, in U.S. Pat. Nos. 2,635,546, 2,910,003, 2,969,740 and 3,366,759.

Certain of these prior art controls were made adjustable to respond to different, predetermined pressures and/or liquid levels for actuation and/or deactuation of the pump by providing adjustable screw means for loading (and unloading) the inner side of the pressure sensitive diaphragm to increase or decrease its resistance to deflection in response to the pressure acting on the outer side of the diaphragm.

Subsequently, pressure responsive controls of this general type were equipped with a switch having an operating differential, i.e., requiring a greater force to actuate or close the switch than to hold it in a closed position. As a result, a single switch and diaphragm could be used to respond to a first or higher liquid level to close the circuit and actuate the pump motor and to respond to the reduction of the liquid level, below that necessary to maintain the switch closed, to open the switch and deactuate the pump motor. Thus the necessary operating differential to make the control responsive to two different pressure conditions to actuate and deactuate the pump became a function of the switch characteristics per se.

Such single switch, single diaphragm controls have not proven entirely satisfactory in practice, however, because of the limited range between the actuating and deactuating forces or operating differential of the switch. For example, one switch commonly used for the purposes of a pressure responsive liquid level control actuates in response to a force of 11 ounces and deactuates when the force acting thereon drops below 2 and ½ ounces.

Since the same diaphragm was a source of both the actuating and the holding force, this meant that the pump would only evacuate about three-fourths of the accumulated liquid depth and, taking into account such practical manufacturing considerations as size of diaphragm and the like, the pump effectively operated to exhaust a liquid level from a depth of about 8 inches to a depth of about 3 inches, plus or minus 2 inches and 1 and ½ inches, respectively.

It is true that by proper container, receptacle or sump design this change in liquid level could be made to represent a greater proportion of contained liquid. It is preferable, however that such controls function well as independently of container design as practical so as to be effective in a wide range of applications, in homes, factories, farms, sumps and the like.

Further it is desirable that the range of actuating pressures (liquid level heights or depths at which actuation takes place) be selectively varied, on a predetermined basis, in order that the control and, therefore, the pump, which is controlled thereby, will be useful or readily adapted to be useful in a wide variety of applications under a wide variety of conditions. However, such variation of switch differential has effected actuation pressure, (the pressure at which the switch responds) so that the pump does not actuate at the same level as it otherwise would with the same switch.

SUMMARY OF THE INVENTION

It is therefore a general object of this invention to provide a new and improved single switch, single diaphragm, pressure responsive, liquid level pump control.

Other objects of this invention include the provision of a new and improved single switch, single diaphragm pressure responsive, liquid level pump control which is readily and easily adapted for a wide range of predetermined actuating pressures; which is economical to construct and use; which may be changed and adjusted in the field even by unskilled persons; and which does not change the structure and nature of the diaphragm per se.

Still further objects of this invention include the provision of new and improved means for selectively varying the actuating response of a single switch, single diaphragm pressure responsive liquid level pump control, and the like, which is economical to make and use; which is readily installed and interchanged to selectively and predeterminately vary and adjust the effective operating differential of the switch and thereby the liquid level at which the actuation or deactuation occurs; which is positive in its action and effect; which restrains or restricts the movement and displacement of the diaphragm in both directions; and which includes means whereby the level of actuation is adjustably controlled to predetermined levels.

Still another object of this invention is to provide a new and improved single switch, single diaphragm pump having an adjustable predetermined turn on point and an adjustable, predetermined switch differential whereby conventional switches having production-type operating characteristics can be adjusted to provide a wide (or narrow) switch operating differential.

A still further object of this invention is to provide a pressure responsive, liquid level control having new and improved means for selectively predetermining the responsive differential of a pressure responsive, liquid level control, obtaining one or more of the objects and advantages set forth above.

These and other objects and advantages of this invention will appear from the following description of a preferred form thereof, reference being had to the accompanying drawing.

This invention contemplates a switch operated by a pressure sensitive diaphragm whose effective diameter may be changed to vary the switch operating differential and thereby the range between the pressure at which the pump is turned on and the pressure at which it is turned off and preloading means in contact with a central portion of the diaphragm for adjusting the turn on pressure independent of the switch operating differential which is provided by the control but in compensation for the effects thereof, if desired.

DETAILED DESCRIPTION OF PREFERRED EMBODIMENT

Figure 1:
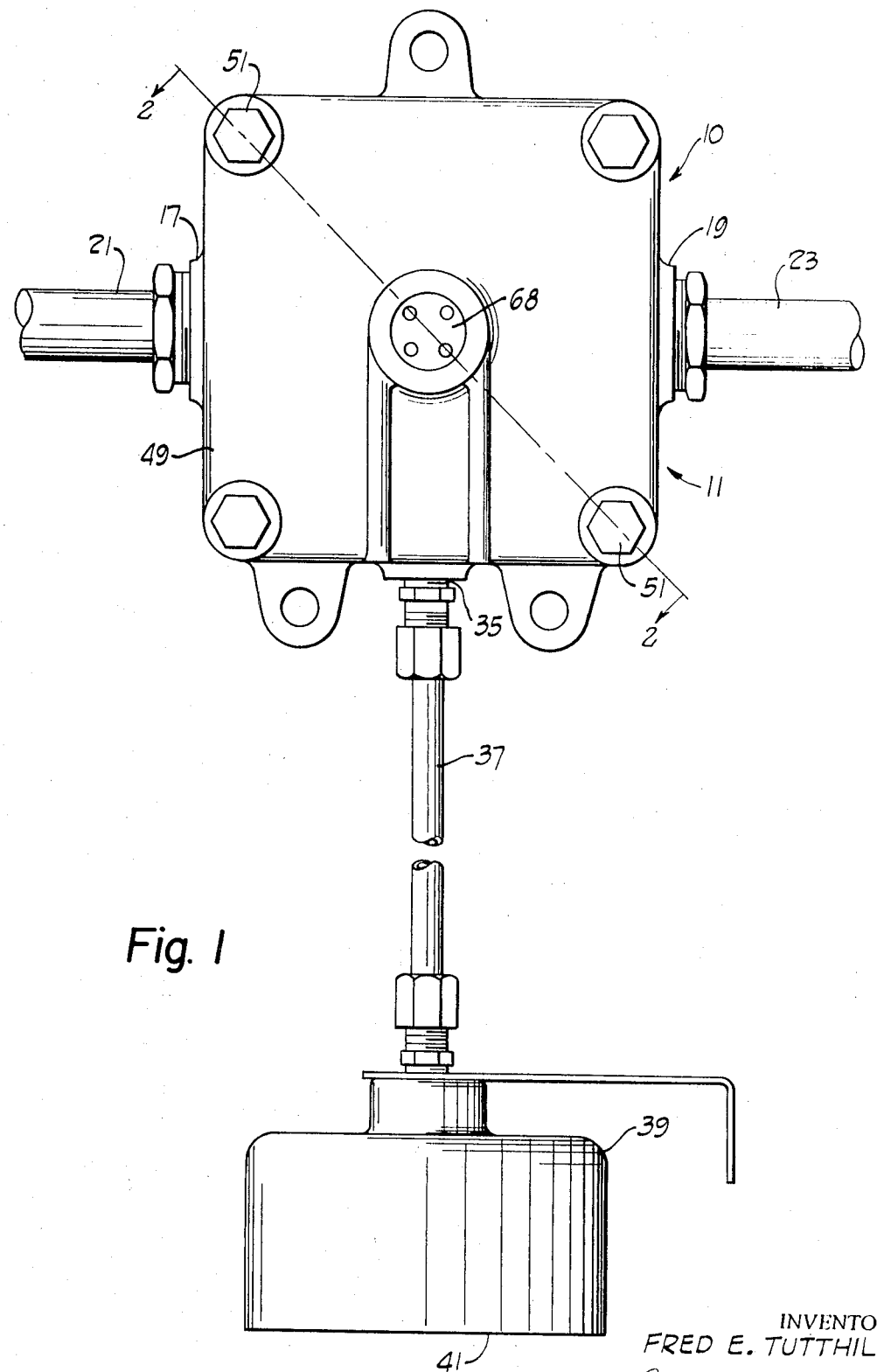
FIG. 1 is an elevation of a pump control embodying this invention.

A pump control embodying this invention is indicated generally at 10 Fig. 1 and includes a housing 11, which is divided into a switch chamber 13 and a pressure chamber 15. The switch chamber 13 is provided with two openings at 17 and 19, Fig. 1, with opening 17 receiving the power input cable 21 and opening 19 receiving the power output cable 23. The openings 17 and 19 are provided with conventional water tight seals (not shown). The power input cable 21 is connected to a suitable source of power (not shown) and the power output cable 23 is connected to a pump (not shown).

The power input cable 21 and the power output cable 23 are connected in conventional manner to an ordinary microswitch 25 which switch controls the actuation and deactuation of the pump. The microswitch 25 is held in position in the switch chamber 13 by a bracket 27.

Figure 2:
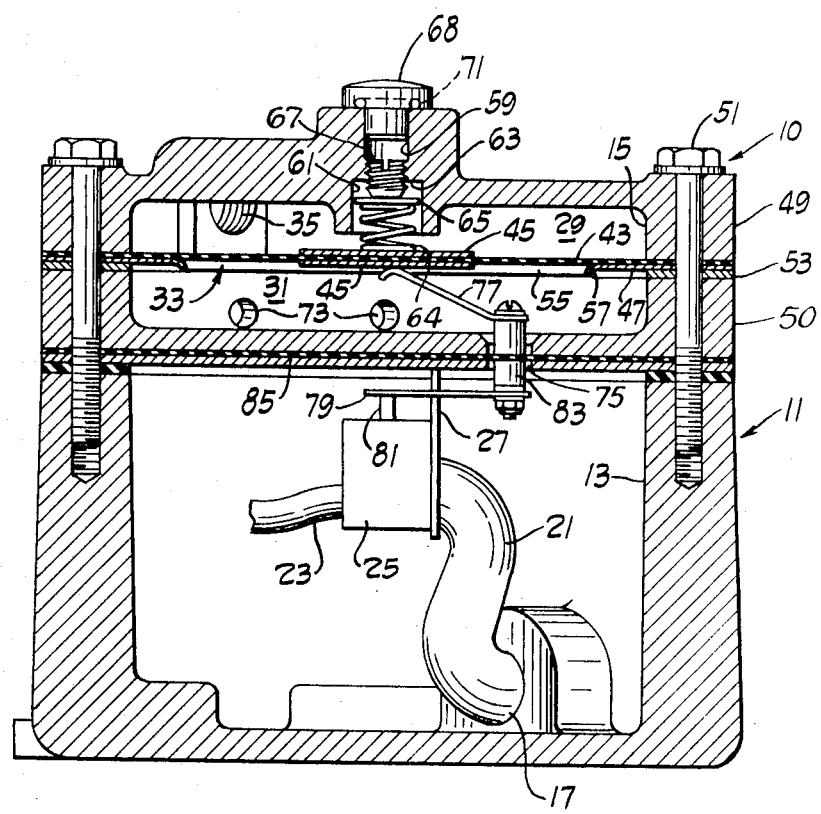
FIG. 2 is a vertical section viewed along the line 2—2 of FIG. 1.

The pressure chamber 15 is divided into a liquid level pressure chamber 29 and an atmospheric pressure chamber 31 by a diaphragm assembly 33, Fig. 2. The liquid level pressure chamber 29 is provided with an opening 35 connected to a hollow tube 37, Fig. 1, extending into the sump or container of liquid (not shown). An inverted cuplike member 39 is affixed to the end of the tube 37 remote from the housing 11. Member 39 is open at its lower end 41 and is immersed in the sump or container of liquid from which the liquid is to be pumped, the level at which member 39 is disposed determining the effective water level pressure which is communicated to the pressure sensitive diaphragm through the tube 37.

The diaphragm assembly 33, Fig. 2, comprises a diaphragm 43, a pair of reinforcing plates 45 and a restricting washer 47. The diaphragm 43 is held in place substantially in the center of the pressure chamber 15 by the two halves 49 and 50 of that portion of the housing 11 defining the pressure chamber 15 by a cap screw 51 at each corner of the upper half 49 and an annular gasket 53. The two reinforcing plates 45 are secured in conventional manner to opposite sides of the diaphragm 43 and they are located substantially in the center of the diaphragm. The restricting washer 47 is formed of a suitable metallic or other rigid material and is a flat annular ringlike member having a central opening 55, which, conveniently, is defined by a downwardly turned skirt 57 which depends from the flange of the washer 47 in the direction of movement of the diaphragm 43. The size of the opening 55 is a given control is varied by substitution of reinforcing washers each of which has a different size opening and can be predetermined as desired and as taught and for the purposes set forth in applicant's U.S. Pat. No. 3,366,759. Changing the size of opening 55 changes the effective diameter of the diaphragm 43 with the attendant change in actuating pressure required to move the diaphragm toward the atmospheric pressure chamber 31 and, therefore, a change in switch operating differential.

The upper half 49 of the pressure chamber is provided with a central opening 59. The opening 59 terminates in a counterbore 61 adjacent the liquid level pressure chamber 29 thereby providing a shoulder 63 between the counterbore 61 and the opening 59. A compression spring 64 is maintained in the counterbore and extends between a disc 65 slidably arranged in the counterbore 61 and the nearer one of the reinforcing plates 45. The location of the disc 65 and thus the force being exerted by the spring 64 on the reinforcing plate 45 is controlled by a setscrew 67 threadably received in the opening 59. Changes in position of the setscrew 67 move the disc 65 toward or away from the reinforcing plate 45 thereby providing for adjustment in the pressure necessary to move the diaphragm 43 toward or away from the atmospheric pressure chamber 31. To protect the setscrew 67 and to insure that liquid does not enter the chamber 29, a cap 68 and an O-ring 71 are provided to close the opening 59. Thus, the turn-on point is adjustably predetermined independent of, and in compensation, if desired, for changes effected therein, by the adjustment of the switch operating differential.

Air relief openings 73 are provided in the lower portion of the lower half 50 of the pressure chamber 15. The air relief openings 73 serve to maintain atmospheric pressure in the pressure chamber 31 and to provide for fluid drain holes in the event that fluid enters the pressure chamber.

To provide for transmittal of the pressure exerted on the diaphragm 43 to control the operation of the microswitch 25, an opening 75 is provided between the switch chamber 13 and the pressure chamber 15. A spring arm 77 is provided in contact with the reinforcing plate 45 in the chamber 31 and a spring arm 79 is provided in the switch chamber in contact with the switch button 81 controlling the operation of the microswitch 25. A connector member 83 joins the spring arms 77 and 79 in such fashion that movement of spring arm 77 is transmitted to spring arm 79. Thus, if the diaphragm 43 moves toward the atmospheric pressure chamber 31 upon the increase of pressure from the tube 37, the spring arm 77 is depressed moving the connector member 83 and thereby depressing the spring arm 79 and thus the switch button 81 to establish the electrical circuit from cables 23 and 21 to start the pump (not shown). Fluid flow through the opening 75 is prevented by a diaphragm 85 separating the housing for the liquid level pressure chamber 15 and the housing for the switch chamber 13.

The switch 25 is normally open and requires a predetermined actuating force to operate button 81 to close the switch and start the pump and opens, after being closed, when the button 81 is no longer opposed by a lesser predetermined force. The depth of the liquid in the sump or fluid container when it is rising increases the pressure in the tube 37 and the liquid level pressure chamber to move the diaphragm 43 thereby depressing the spring arm 77, the spring arm 79 and the switch button 81 closing the switch. As the fluid level in the sump decreases the pressure in the tube 37 will also decrease until it reaches the predetermined level at which the switch button 81 will open. If the switch 25 were only used to control the on and off of the pump, the liquid level control would vary considerably depending upon the characteristics of this specific switch 25. In this invention adequate and variable control is obtained by the characteristics of the diaphragm 43, the restricting washer 47 and the spring 64. By in effect, varying the size of the opening 55 in the restricting washer 47, the effective area of diaphragm 43 may be changed in a direction to actuate the switch so that a greater or lesser pressure (depth of liquid) is necessary to provide the switch actuating force, as desired relative to that necessary to maintain the switch actuated. The "level" at which these relative actuating and deactuating pressures function is moved or displaced by selective preloading (adjustment) of spring 64, so that the actual turn-on point is determined by the combination of forces exerted by spring 64 and hydrostatic pressure in opposition to the switch operating force and the switch operating differential is extended by the effect of the washer 47 only restricting diaphragm movement in one direction thereby, in effect, creating a diaphragm of one area for "turn-on" movement and of a different area for "turnoff" movement. The size of the reinforcing discs 45 is also varied as desired to further effect the diaphragm operating characteristics, reduction of size of the reinforcing disc 45 tending to increase the switch operating differential and increasing the size of the reinforcing disc having the opposite effect.

In contrast, of course, decreasing the size of opening 55 increases the switch operating differential and increasing the size of the opening decreases the switch operating differential.

By the utilization of varying size openings in the restricting washer 47 and varying the location of the compression spring one is able in the factory or in the field to vary the actuation and deactuation level and the differential therebetween of the control and, therefore, the pump thereby permitting close control of the fluid level in the sump or fluid container. If the spring 64 is to be adjusted, all that is required is the removal of the plug cap 68 and an adjustment of the setscrew 67. Further adjustment in the operating pressure of the diaphragm 43 may be made in the field by removal of the four cap screws 51 from the upper half 49 of the pressure chamber 15. A different restricting washer 47 having a different size opening 55 may be inserted and the assembly returned to its original position.

Modifications and changes to the preferred form of the invention disclosed herein may occur to those skilled in the art who come to understand the principles and precepts thereof. Accordingly, the scope of the patent to be issued hereon should not be limited to the forms of the invention herein specifically depicted and described but by the advance by which the invention has promoted the art.

I claim:

1. A pressure responsive liquid level pump control comprising a housing, a switch, having an operating force, for connection to a source of electrical energy and a pump, means controlling the actuation and deactuation of said switch, a pressure responsive diaphragm means, having two sides and including a single diaphragm, mounted in said housing with one said side engaging and coacting with said means for controlling the actuation and deactuation of said switch, and an annular restricting washer having a central opening of predetermined area contiguous with said one side of said diaphragm means and restricting movement of said diaphragm means in a direction to actuate said switch, said switch operating force biasing said diaphragm means in a direction away from said restricting washer, adjustable, resilient preloading means engaging the other side of said diaphragm means and biasing said diaphragm means in a direction to actuate said switch, and means connecting said housing on said other side of said diaphragm means to a liquid container whereby changes in the level of the liquid in said container vary the pressure acting on said other side of said diaphragm means.

2. A pump control according to claim 1 in which said adjustable, resilient preloading means comprises a compression spring having two ends, one of which engages said diaphragm means.

3. A pump control according to claim 2 including an adjustable seat for said spring at the end thereof remote from said diaphragm means.

4. A pump control according to claim 1 wherein said housing comprises a switch chamber and a pressure chamber, said switch being located in said switch chamber, said diaphragm means being located in said pressure chamber.

5. A pump control according to claim 4 wherein said pressure chamber is divided by said diaphragm means into a liquid level pressure chamber and an atmospheric pressure chamber.

6. A pump control according to claim 5 wherein said adjustable, resilient preloading means is located in said liquid level pressure chamber.

7. A pump control according to claim 1 wherein said restricting washer comprises a flat, ringlike portion and a skirt portion depending in a smooth curve from said flat ringlike portion and defining said opening.

8. A pressure responsive, liquid level pump control comprising a housing, a switch, having an operating force, for connection to a source of electrical energy and a pump, means controlling the actuation and deactuation of said switch, a pressure responsive diaphragm means, having two sides and including a single diaphragm, mounted in said housing and having one said side engaging and coacting with said means for controlling the actuation and deactuation of said switch, said switch operating force biasing said diaphragm means in a direction to deactuate said switch, adjustable, resilient preloading means engaging the other side of said diaphragm means and biasing said diaphragm means in a direction to actuate said switch, and means connecting said housing on the other side of said diaphragm means to a liquid container whereby changes in the level of the liquid in said container vary the pressure acting on said other side of said diaphragm means, said adjustable, resilient preloading means comprising a compression spring having two ends and an adjustable seat, one end of said spring engaging said diaphragm means and the other end of said spring engaging said adjustable seat.